(12) United States Patent
Singh et al.

(10) Patent No.: US 11,392,994 B2
(45) Date of Patent: Jul. 19, 2022

(54) RETAIL DIGITAL SIGNAGE AND AUTOMATIC PROMOTION SYSTEM

(71) Applicant: Wayne Fueling Systems LLC, Austin, TX (US)

(72) Inventors: Kalpit Singh, Jaipur (IN); Hob Hairston, Cedar Park, TX (US); Henry Fieglein, Leander, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

(21) Appl. No.: 16/574,670

(22) Filed: Sep. 18, 2019

(65) Prior Publication Data
US 2021/0081999 A1    Mar. 18, 2021

(51) Int. Cl.
*G06Q 30/02*    (2012.01)
*G06Q 30/06*    (2012.01)

(52) U.S. Cl.
CPC ..... *G06Q 30/0272* (2013.01); *G06Q 30/0222* (2013.01); *G06Q 30/0641* (2013.01)

(58) Field of Classification Search
CPC ....... H02J 7/00; G06Q 30/0634; G06Q 30/06; G06Q 30/02; G06Q 10/087; G01K 3/005; G06K 19/0717; G01N 21/17; G08B 21/18
USPC ..................................................... 705/14.25
See application file for complete search history.

(56) References Cited

U.S. PATENT DOCUMENTS

| | | | |
|---|---|---|---|
| 5,544,281 A | 8/1996 | Maruoka et al. | |
| 7,675,424 B2 * | 3/2010 | Debord | G01K 3/005 340/539.19 |
| 8,140,381 B1 | 3/2012 | Wu et al. | |
| 9,679,326 B2 * | 6/2017 | Elberbaum | H02J 7/00 |
| 10,373,472 B2 * | 8/2019 | Johnston | G08B 21/18 |
| 2004/0128261 A1 | 7/2004 | Olavson et al. | |
| 2005/0248455 A1 * | 11/2005 | Pope | G06Q 30/06 340/539.27 |
| 2007/0258048 A1 * | 11/2007 | Pitchers | G06K 19/0717 353/26 R |

(Continued)

FOREIGN PATENT DOCUMENTS

JP    2000331068 A    11/2000

*Primary Examiner* — Saba Dagnew
(74) *Attorney, Agent, or Firm* — Mintz Levin Cohn Ferris Glovsky and Popeo, PC; Lisa Adams (57) ABSTRACT

In an aspect, a cloud-based server can establish a communications channel with a merchant device over a computer network. The cloud-based server can receive product information characterizing a product from the merchant device via the communications channel. The product information can include at least one measurement characterizing the product acquired in real-time by at least one sensor communicatively coupled to the merchant device. The cloud-based server can calculate a remaining life of the product based on the product information received from the merchant device. The cloud-based server can calculate a real-time price of the product based on a plurality of factors including the calculated remaining life of the product. The cloud-based server can transmit a promotion to purchase the product at a discount to a first client device in response to determining that the remaining life of the product is less than a predefined threshold, the discount calculated based upon the real-time price of the product.

22 Claims, 5 Drawing Sheets

(56) References Cited

U.S. PATENT DOCUMENTS

| | | | |
|---|---|---|---|
| 2011/0153400 A1* | 6/2011 | Averbuch | G06Q 30/02 |
| | | | 705/14.25 |
| 2012/0109731 A1* | 5/2012 | Averbuch | G06Q 30/02 |
| | | | 705/14.24 |
| 2014/0044893 A1* | 2/2014 | Shipway | C09D 11/36 |
| | | | 428/29 |
| 2014/0151538 A1* | 6/2014 | Syed | G01N 21/17 |
| | | | 250/222.1 |
| 2016/0086146 A1* | 3/2016 | Brown | G06Q 10/087 |
| | | | 705/14.27 |
| 2016/0259341 A1* | 9/2016 | High | G06Q 30/0631 |
| 2019/0005429 A1* | 1/2019 | Patel | G06Q 10/06314 |

* cited by examiner

RETAIL DIGITAL SIGNAGE AND AUTOMATIC PROMOTION SYSTEM

TECHNICAL FIELD

The subject matter described herein relates to retail digital signage and automatic promotion systems.

BACKGROUND

Typically, digital retail signage and automatic promotion systems can facilitate broadcasting predetermined discounts. For example, product distributors and/or storeowners may arbitrarily discount a product and broadcast the promotion of the discounted product over some available channels (e.g., mobile applications installed on consumer mobile devices, fuel dispenser displays, displays within the store, and/or the like) for a limited time.

Some retail establishments (e.g., fuel station convenience stores, and/or the like) can carry perishable products. The perishable products can be distributed to the stores by product distributors. When perishable products expire, the product distributors and storeowners bear the cost of the expiration of the product. And globally, the expiration of perishable products can lead to billions of pounds of food waste a year.

SUMMARY

Methods and systems are provided for retail digital signage and automatic promotion. In an embodiment, a cloud-based server can establish a communications channel with a merchant device over a computer network. The cloud-based server can receive product information characterizing a product from the merchant device via the communications channel. The product information can include at least one measurement characterizing the product acquired in real-time by at least one sensor communicatively coupled to the merchant device. The cloud-based server can calculate a remaining life of the product based on the product information received from the merchant device. The cloud-based server can calculate a real-time price of the product based on a plurality of factors including the calculated remaining life of the product. The cloud-based server can transmit a promotion to purchase the product at a discount to a first client device in response to determining that the remaining life of the product is less than a predefined threshold, the discount calculated based upon the real-time price of the product.

One or more of the following features can be included in any feasible combination. The cloud-based server can transmit, to a second client device and to be displayed on a graphical user interface display space of the second client device, at least one of the remaining life of the product, an original price of the product, the real-time price of the product, a number of remaining units of the product, and a flag indicating whether the promotion to purchase the product at the discount has been transmitted.

The cloud-based server can transmit to the first client device, and to be displayed on a graphical user interface display space of the first client device, the promotion to purchase the product at the discount. The cloud-based server can transmit an alert to a second client device in response to calculating that the remaining life of the product is less than the predefined threshold. The cloud-based server can receive, from the second client device, user input initiating the transmitting of the promotion to purchase the product at the discount to the first client device. The promotion to purchase the product at the discount can be transmitted to the first client device in response to receiving the user input.

Calculating the remaining life of the product can include calculating a percent depreciation of the product. The percent depreciation of the product can be a function of a type of the product, a life of the product, a percent affected with favorable environmental conditions, a percent affected with unfavorable environmental conditions, and a packaging of the product. Calculating the remaining life of the product can further be based on at least one of manufacturing date, expiration date, best-before date, demand and supply, favorable environmental conditions, favorable temperature, favorable humidity, favorable packaging, favorable weather, and favorable solvents.

The plurality of factors can further include at least one of environmental conditions, packaging, region, season, customer type, store type, temperature, humidity, light, number of units of the product remaining, age of the product, weather forecast, demand and supply, type of the product, and number of units of the product sold. The merchant device can include a communications-enabled refrigerator, a communications-enabled cold storage, a communications-enabled low humidity silica container, a communications-enabled humidity inducing water sprayer based container, a communications-enabled luminous containers, a communications-enabled pH maintaining containers, and a communications-enabled hot storage. The first client device can include at least one of a mobile device, a fuel dispenser, a television, a store display, a registered mobile device, a digital billboard, a video player in a car, a navigation system, a smart speaker, a smart watch, a health based fitness watch, a smart glasses, an advertisement display, and an advertisement communications channel.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

Like reference symbols in the various drawings indicate like elements.

DETAILED DESCRIPTION

Typical digital retail signage and automatic promotion systems have several drawbacks. For example, a product may be discounted arbitrarily and product distributors and/or storeowners may not take many factors, such as the remaining life of the product, into account when discounting a product. And product distributors and/or storeowners may not be able to monitor the real-time quality of products (e.g., the remaining life of the products, the storage conditions of the products, and/or the like). And some products, such as perishable products, can expire, and the product distributors and/or storeowners bear the cost of the expiration of the perishable products. Accordingly, it can be desirable to monitor the quality of products in real-time, notify product distributors and store owners when the quality of products in their stores falls below a predetermined quality, determine discounted real-time prices of products, and transmit promotions reflecting the discounted prices across all available channels.

Some embodiments of the current subject matter can facilitate monitoring the quality of products (e.g., perishable products) in real-time, notifying product distributors and store owners of the quality of products in their stores, determining real-time prices of monitored products, and transmitting promotions to purchase the products at a discount across all available channels. For example, information about the real-time storage conditions of a product, such as the storage temperature, can be used to calculate the depreciation in the quality of the product. The depreciation in the quality of the product can be used to alert product distributors and storeowners, such as, through a mobile application, that the quality of the product has fallen below a predetermined amount. Once alerted, the product distributors and/or storeowners can initiate transmitting promotions to purchase the product at a discount to all available channels. As such, some implementations of the current subject matter can facilitate monitoring the quality of products in real-time, determining appropriate prices for products given the quality of the products, and transmitting real-time promotions across all available channels. Accordingly, food waste can be prevented and improved retail digital signage and automatic promotion systems can be achieved.

Figure 1:
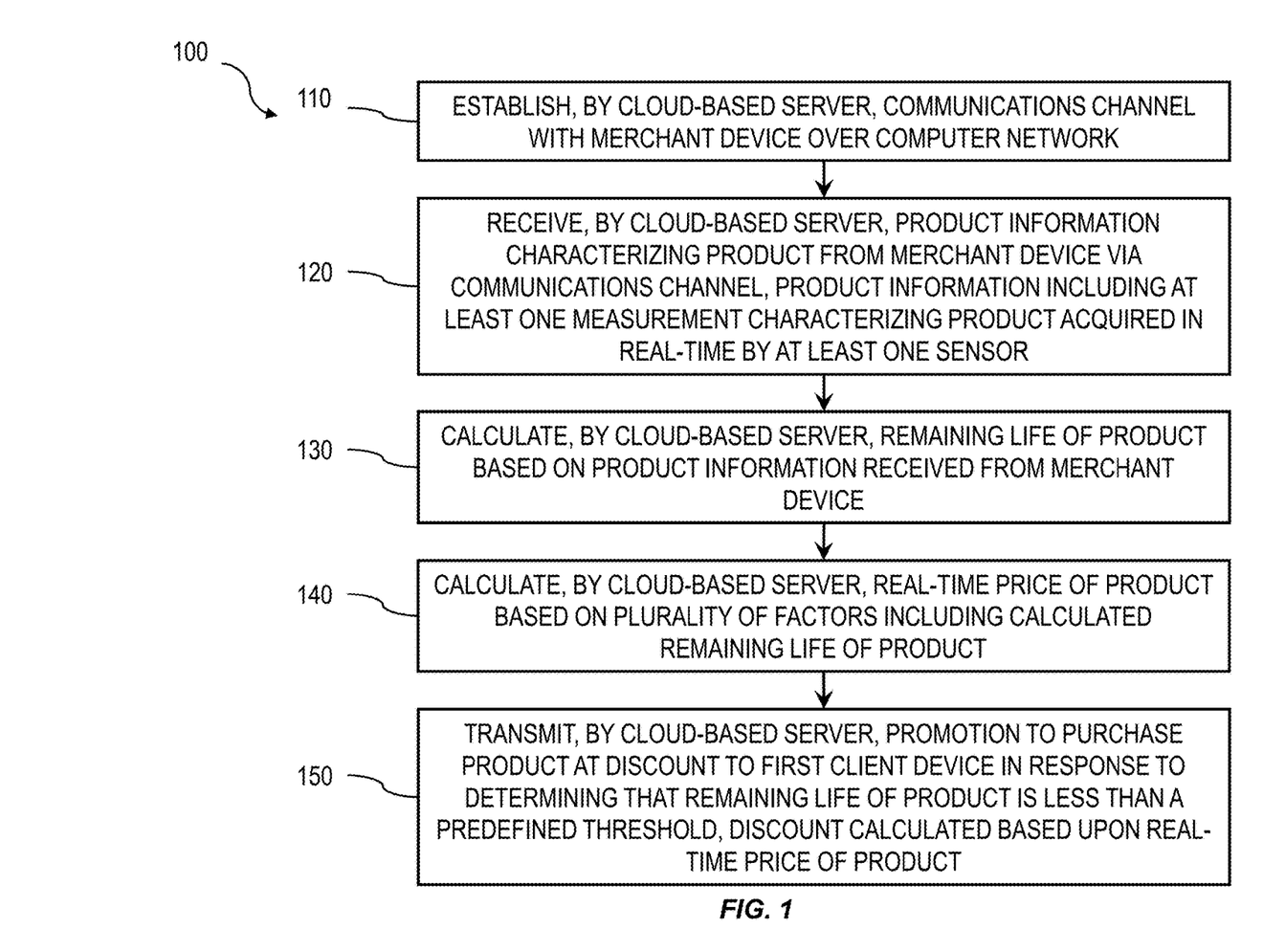
FIG. 1 is a process flow diagram illustrating an exemplary process of automatic promotion.

FIG. 1 is a process flow diagram illustrating an exemplary process 100 of automatic promotion. By facilitating monitoring the quality of products in real-time, determining appropriate prices for products given the quality of the products, and transmitting real-time promotions across all available channels, process 100 can help prevent food waste. Thus, product distributors and/or storeowners can save the costs borne when products, such as perishable products, have surpassed their recommended shelf life.

At 110, a communications channel can be established over a computer network by a cloud-based server. The communications channel can be established with a merchant device. The communications channel can include a physical transmission medium, such as a wire, a logical connection over a multiplexed medium, such as a radio channel, and/or the like. The communications channel can be used to transmit and receive information signals, such as digital bit streams, packets, and/or the like, between the cloud-based server and the merchant device. And the communications channel can include a capacity for transmitting and receiving information, such as a bandwidth, data rate, and/or the like.

At 120, product information characterizing a product can be received. The product information can be received from the merchant device via the communications channel. The product information can include at least one measurement characterizing the product. For example, the measurements can include the storage temperature, the storage pressure, the storage humidity, the storage brightness, and/or the like. The measurement can be acquired in real-time by at least one sensor coupled to the merchant device. For example, the sensor coupled to the merchant device can include a thermometer, a barometer, a hygrometer, a light sensor, and/or the like. The merchant device can include, for example, a refrigerator, a cold storage, a hot storage, Internet of Things enabled devices, and/or the like.

At 130, a remaining life of the product can be calculated by the cloud-based server. The remaining life of the product can be calculated based on the product information received from the merchant device. As will be described below, in addition to or alternative to the information received from the merchant device, the remaining life of the product can be calculated based on, for example, information received from the manufacturer of the product, such as the type of packaging used to package the product, the manufacturing date of the product, the expiration date of the product, the best before date of the product, and/or the like.

At 140, a real-time price of the product can be calculated. The real-time price of the product can be calculated based on a plurality of factors. The plurality of factors can include, for example, the calculated remaining life of the product, environmental conditions, region, season, customer type, store type, and/or the like. As will be discussed below, the plurality of factors can be used to calculate the real-time price of the product.

At 150, a promotion to purchase the product at a discount can be transmitted by the cloud-based server. The promotion to purchase the product at the discount can be transmitted to a first client device in response to determining that the remaining life of the product is less than a predefined threshold. As will be discussed below, the discount can be calculated based upon, for example, the real-time price of the product and/or other factors. The promotion to purchase the product can be transmit by the cloud-based server and to the first client device. For example, a communications channel can be established by the cloud-based server and with the first client device over a computer network and, as will be discussed below, the offer can be transmitted from the cloud-based server and to the first client device.

Figure 2:
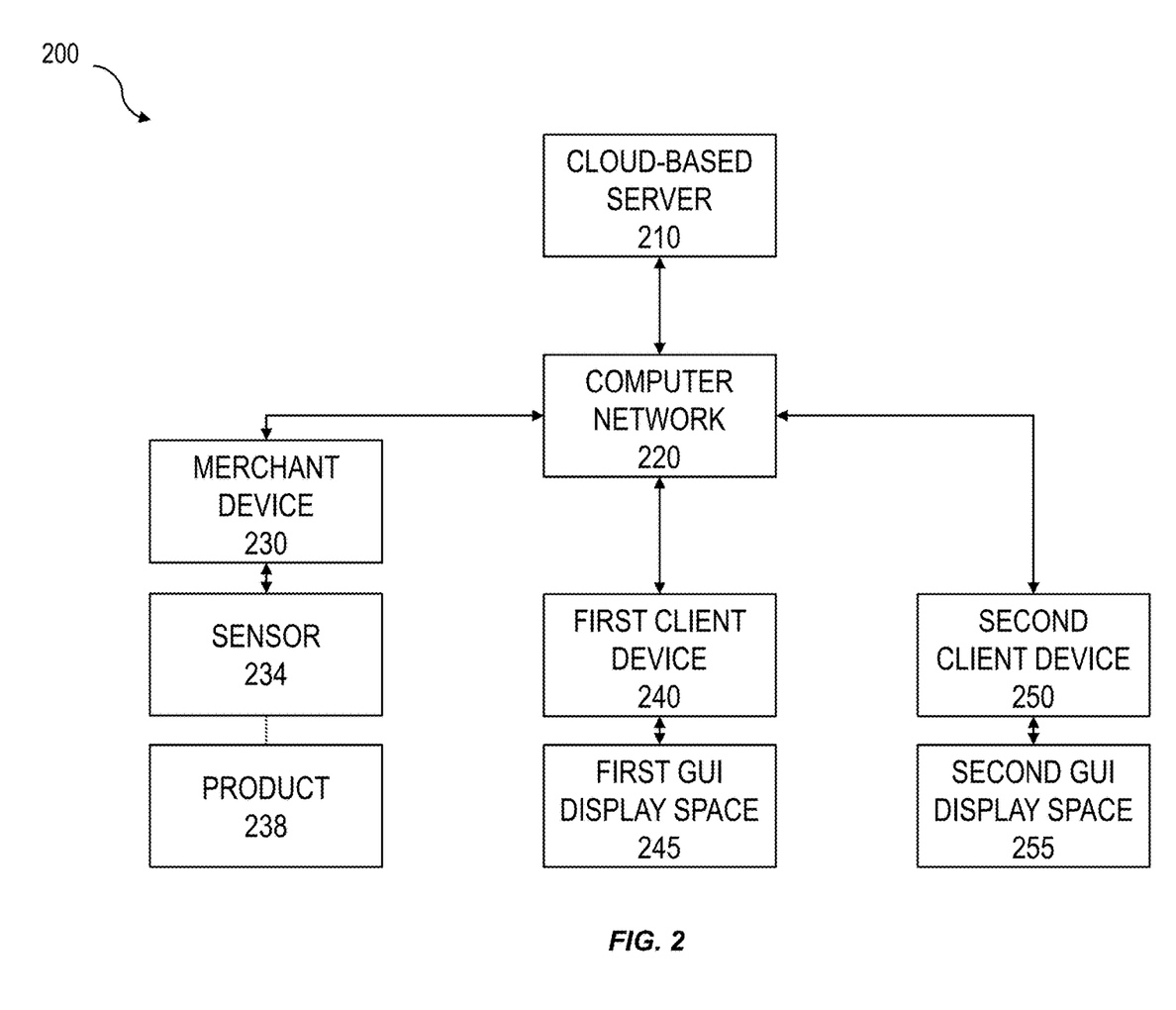
FIG. 2 is a system block diagram illustrating an exemplary embodiment of an automatic promotion system.

FIG. 2 is a system block diagram illustrating an exemplary embodiment of an automatic promotion system 200. System 200 can include a cloud-based server 210, a computer network 220, a merchant device 230, a first client device 240, and a second client device 250. By facilitating monitoring the quality of products in real-time, determining appropriate prices for products given the quality of the products, and transmitting real-time promotions across all available channels, system 200 can help prevent food waste. Thus, product distributors and/or storeowners can save the costs borne when products, such as perishable products, have surpassed their recommended shelf life.

Cloud-based server 210 can facilitate calculating the remaining life of the product and the real-time price of the product 238. For example, cloud-based server 210 can receive a plurality of information about product 238 from merchant device 230, a database (e.g., relational database, non-relational database, data warehouse, distributed data store, and/or the like), and/or the like. Cloud-based server 210 can use the plurality of information about product 238 to, for example, calculate a percent depreciation of product 238. The plurality of information can include, for example, a product type stored in a hierarchy of different types of products using a tree data structure (e.g., Dairy→Cheese-→CottageCheese→AmulCottageCheese). Other examples of the plurality of information can include, for example, the life of the product (e.g., calculated using the manufacturing date, the expiration date, the best before date, and/or the like), the normal environmental conditions need for the product (e.g., temperature range, humidity/moisture, and/or the like), the type of packing, the percent depreciation if the product is kept in an undesirable environmental condition for some amount of time, the percent depreciation if the product is kept in a desirable condition, and/or the like. Cloud-based server 210 can calculate percent depreciation as, for example, $$\text{Percent Depreciation}(\text{product}) = \\ f(\text{product type}) + f(\text{reminaing life of product}) + \\ f(\text{percent affected with favorable environmental conditions}) + \\ f(\text{percent affected with unfavorable environmental conditions}) + \\ f(\text{packing type}), \text{where each of the} \\ f \text{ values can be predefined for each product.}$$

To illustrate calculating the percent depreciation, consider the following example with milk as the product. For example, the product type of milk can be defined as a perishable dairy product, and the value of the product type (e.g., f(product type) and/or the like) can be calculated based on, for example, the average demand and supply along with other factors, such as weather. For milk, the value of the product type can be predefined as 2%. For example, the remaining life of the product can be 45%, if, for example, the life of milk is 90 days and it has been 50 days, then the remaining life of the product is 40 days, or $$\frac{40}{90} \approx 45\%.$$

For example, the percent affected with favorable environmental conditions for milk can be 0% since milk is perishable and its quality may not increase, even when favorable conditions are provided. As another example, the quality of a product like wine can increase under favorable conditions and can include a positive value. For example, the percent affected with unfavorable environmental conditions for milk can be 40%, for example, due to high temperatures in the storage container. The packing type can include, for example, a tetra pack, which can include, for example, a packing type depreciation of 5%, and can be constant for different types of packaging. The packing depreciation can be based on a packing affect over the life of the product. In this example, the percent depreciation for milk can be the sum of the depreciations due to product type, remaining life of the product, favorable environmental conditions, unfavorable environmental conditions, and packing type (e.g., percent depreciation=2%+45%+0%+40%+5%=92%). This can mean that the product quality, in the preceding example, of the milk has been degraded by 92%.

The percent depreciation can be provided as an input parameter (e.g., predictor) to a machine-learning model to calculate the real-time price of product 238. Other input parameters can be used by the machine learning model to provide the real-time price of product 238, such as historical supply and/or demand of the product analyzed on various constraints such as target customer type (e.g., spend per transaction, preference based, region, and/or the like), manufacturing region, climate, weather, season, supply, demand, and/or the like. And the input parameters can include a sales history of product 238 analyzed on different constraints, such as customer type, weather, weather forecast, season, region (e.g., manufacturing, selling, and/or the like), climate, store information (e.g., type, scale (e.g., big, small, and/or the like), and/or the like). Based on the above mentioned parameters, cloud-based server 210 can calculate the real-time price of product 238 as a function of quality predictors and price predictors, for example, Real-Time Price=$f$(percent depreciation)+$f$(historical supply and demand)+$f$(historical sales)

Computer network 220 can include a digital telecommunications network and can allow nodes, such as cloud-based server 210, merchant device 230, first-client device 240, second client-device 250, and/or the like can include a communications component. The communications component can facilitate establishing communications channels between two or more of the devices. For example, the communications component can enable wired communication, such as via Ethernet, and can include a transceiver for communicating via a wireless protocol, such as a Bluetooth protocol, cellular protocol, IEEE 802.11b/g/n/ac direct sequence (Wi-Fi) protocol, near field communication (NFC) protocol, a radio frequency identification (RFID) protocol, and/or the like. Wired and/or wireless communication via the communication system can be enabled via any communication protocol, such as transmission control protocol/internet protocol (TCP/IP). Wireless cellular connectivity can include 4G, 4G LTE, 5G, or any mobile communication standard. Additionally, communication can include serial communication, such as via RS-485, RS-422, current loop, and/or the like. The communications component can facilitate communication between cloud-based server 210, merchant device 230, first-client device 240, second client-device 250, and/or the like over computer network 220. Computer network 220 can include the Internet, a wireless wide area network, a local area network, a wide area network, a controller area network, a wired network, or the like.

Merchant device 230 can include a refrigerator, a cold storage, a hot storage, an Internet of Things enabled device, and/or the like. Sensor 234 can include a thermometer, a barometer, a hygrometer, a light sensor. Product 238 can be stored in merchant device 230 and information about product 238, such as storage temperature, and/or the like can be collected by sensor 234. As described above, merchant device 230 can include a communications component that can facilitate communicating information with other devices, such as cloud-based server 210. The product information collected by sensor 234 can be transmitted by merchant device 230 to cloud-based server 210 for use in calculating the percent depreciation of product 238, calculating the real-time price of product 238, inventory management, and/or the like.

First client device 240 and second client device 250 can include a desktop, laptop, tablet, smart phone, and/or the like. First client device 240 and second client device 250 can include at least one processor and memory. First client device 240 can include a first graphical user interface display space 245 with an exemplary interface illustrated in FIG. 4 and second client device 250 can include a second graphical user interface display space 255 with an exemplary interface illustrated in FIG. 5.

Figure 3:
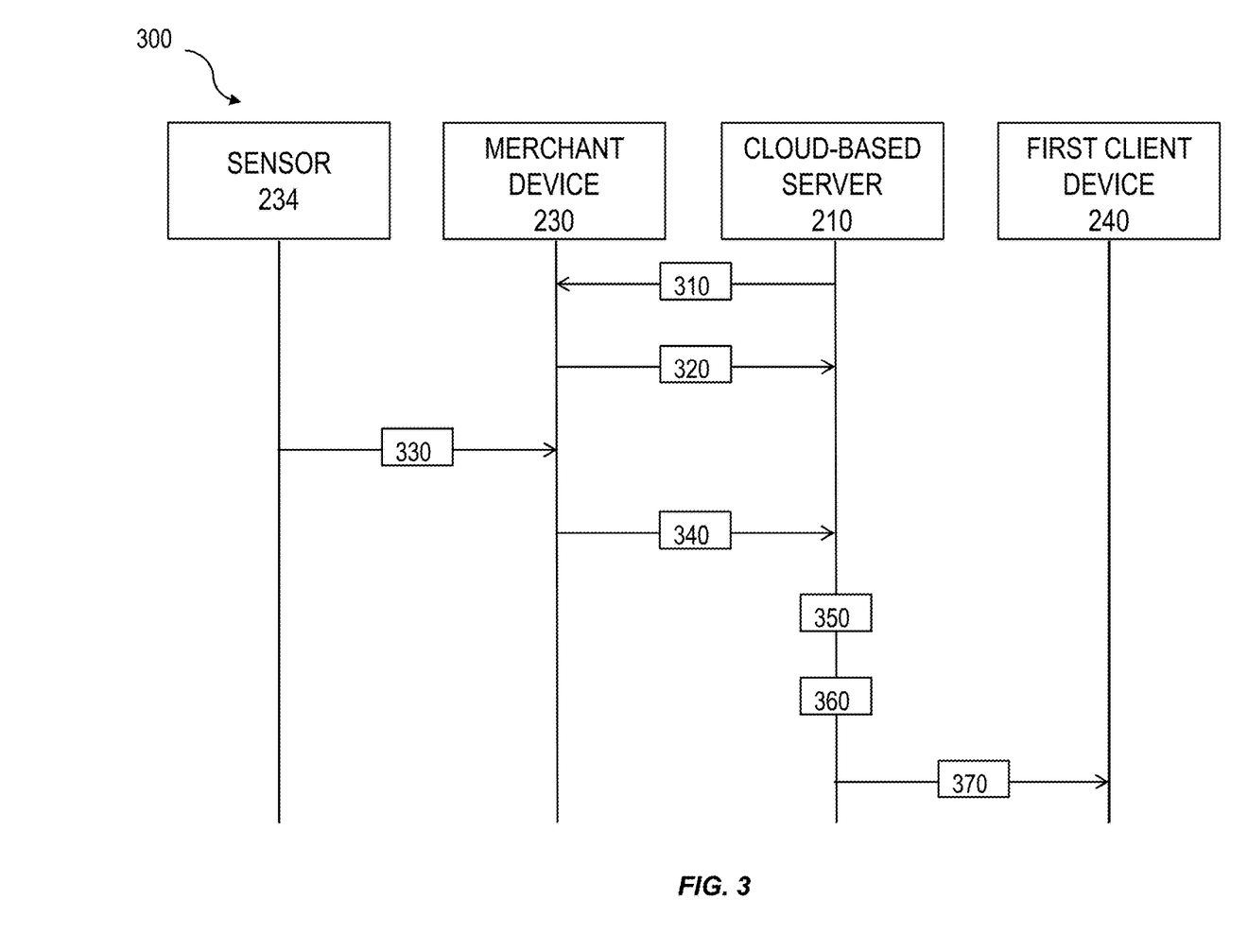
FIG. 3 is a data flow diagram illustrating data flows in an exemplary embodiment of automatic promotion.

FIG. 3 is a data flow diagram illustrating data flows 300 in an exemplary embodiment of automatic promotion, such as process 100 illustrated in FIG. 1. By facilitating monitoring the quality of products in real-time, determining appropriate prices for products given the quality of the products, and transmitting real-time promotions across all available channels, some implementations of the current subject matter can help prevent food waste. Thus, product distributors and/or storeowners can save the costs borne when products, such as perishable products, have surpassed their recommended shelf life.

At 310, cloud-based server 210 can initiate establishing a communication channel with merchant device 230. The communication channel can include a temporary information interchange between the cloud-based server and the merchant device. For example, cloud-based server 210 can transmit a request to establish a communication channel with merchant device 230. Merchant device 230 can receive the request.

At 320, merchant device 230 can transmit a response to the request from cloud-based server 210 to establish the communications channel. Upon sending the response, the communications channel between cloud-based server 210 and merchant device 230 can be established. With the communications channel established, information can be exchanged between cloud-based server 210 and merchant device 230.

At 330, sensor 234 can acquire measurements characterizing the product 238 in real-time. As discussed above, the measurements can include the storage temperature, the storage pressure, the storage humidity, the storage brightness, and/or the like. Sensor 234 can transmit product information, including the acquired measurements, to merchant device 230. The product information can be received by merchant device 230. At 340, merchant device 230 can transmit the product information to cloud-based server 210. Cloud-based server 210 can receive the product information, including the measurements acquired by sensor 234.

At 350, cloud-based server 210 can calculate a remaining life of product 238 based on the product information received at 340. At 360, cloud-based server 210 can calculate a real-time price of product 238 based on a plurality of factors. The plurality of factors can include the remaining life of product 238 calculated at 350.

At 370, cloud-based server 210 can transmit a promotion to purchase product 238 at a discount. The promotion to purchase product 238 can be transmit to first client device 240 in response to determining that the remaining life of product 238 is less than a predefined threshold. And the promotion to purchase product 238 can be based on the real-time price of product 238 calculated by cloud-based server 210 at 360.

Figure 4:
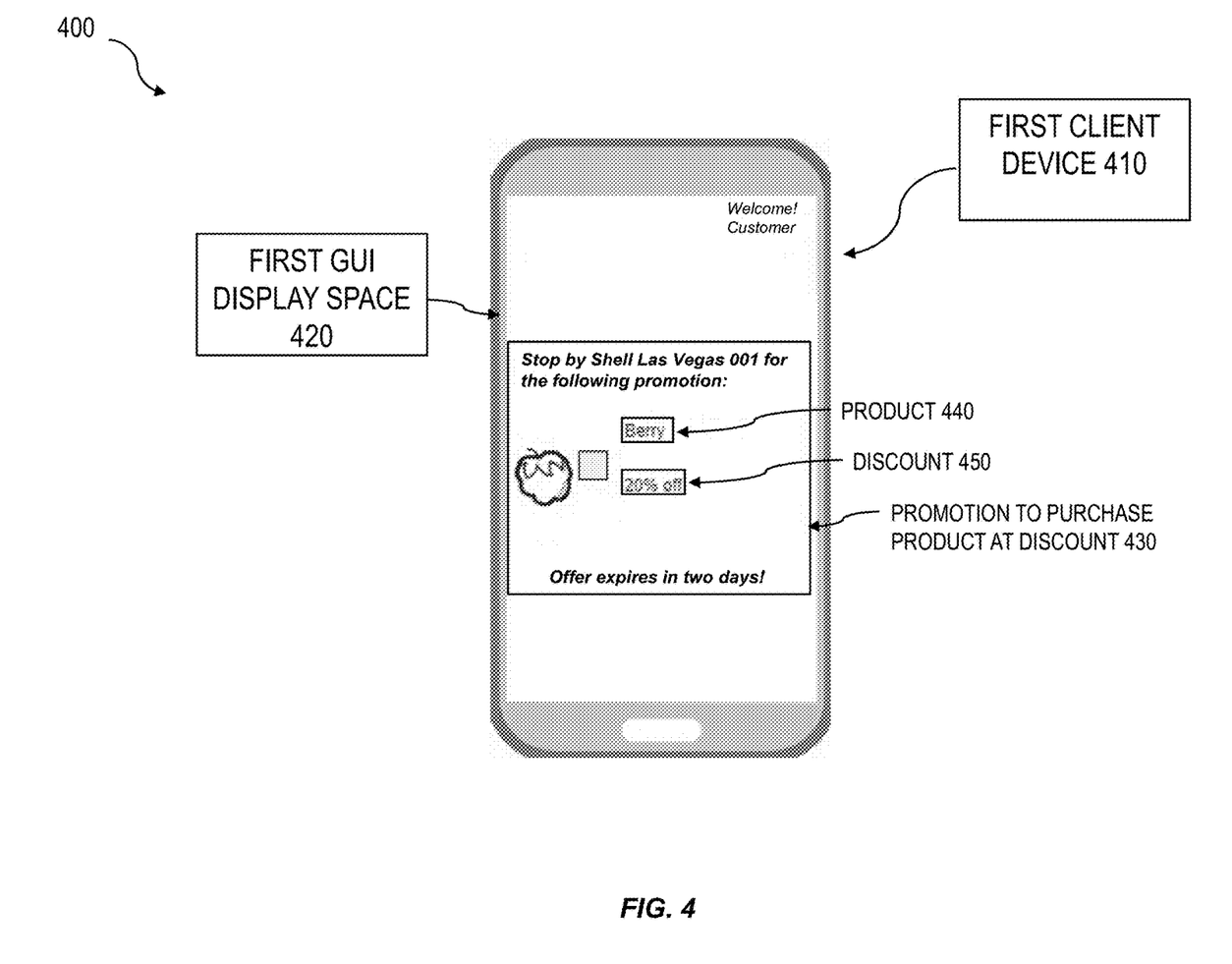
FIG. 4 is a diagram illustrating an exemplary user interface.

FIG. 4 is a diagram 400 illustrating an exemplary user interface 420. By facilitating transmitting real-time promotions across all available channels, interface 420 can help prevent food waste. Thus, product distributors and/or storeowners can save the costs borne when products, such as perishable products, have surpassed their recommended shelf life.

First client device 410 can include a first graphical user interface (GUI) display space 420. A promotion to purchase the product at a discount 430 can be displayed on first GUI display space 420. The promotion to purchase the product at the discount 430 can include the product 440 and the discount 450. For example, the product 440 can include a berry being offered at a discount 450 of 20% off.

Figure 5:
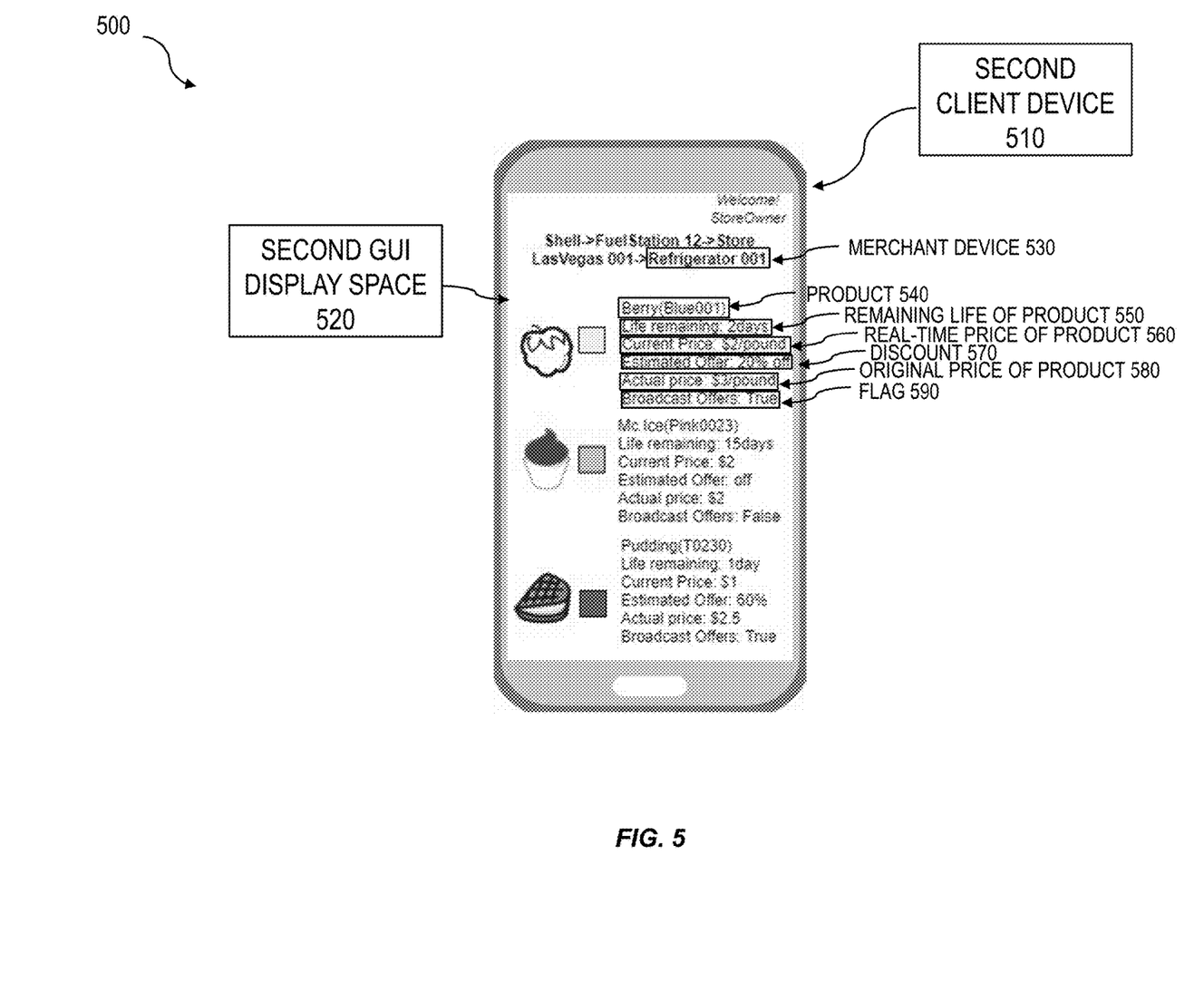
FIG. 5 is a diagram illustrating an exemplary user interface.

FIG. 5 is a diagram 500 illustrating an exemplary user interface 520. By facilitating monitoring the quality of products in real-time, determining appropriate prices for products given the quality of the products, and transmitting real-time promotions across all available channels, interface 520 can help prevent food waste. Thus, product distributors and/or storeowners can save the costs borne when products, such as perishable products, have surpassed their recommended shelf life.

Second client device 510 can include a second graphical user interface (GUI) display space 520. Second GUI display space 520 can facilitate monitoring the products in a given store. In the example illustrated in FIG. 5, the products in a specific merchant device 530, for example, Refrigerator 001 in store LasVegas 001, can be monitored. It should be appreciated that the products monitored may not be limited to a specific merchant device in a specific store, but can also include many stores across many geographic locations. Turning back to FIG. 5, merchant device 530 can include one or more products 540. For example, product 540 can include, but is not limited to, Berry (Blue001), Mc. Ice (Pink0023), and Pudding (T0230), and any products can be included. For the sake of illustration, attention will be focused on product 540 Berry (Blue001) illustrated in FIG. 4. The information in interface 520 can include the remaining life of the product 550, the real-time price of the product 560, the discount 570, the original price of the product 580, and a Boolean flag 590 indicating whether the promotion to purchase the product at a discount has been transmitted. As can be appreciated from the preceding example, remaining life of the product 550 can be used in the promotion to purchase the product at a discount 430 as, for example, the amount of time the promotion can be valid. And the discount 570 can be provided as, for example, the discount 450.

Although a few variations have been described in detail above, other modifications or additions are possible. For example, a smart industry level refrigerator network which can predict the price of the product inside it and automatically transmit the price to consumers. As another example, a smart inventory system that can automatically detect products about to expire, calculate a discount promotion to increase sales of the product, and transmit the promotion across various advertisement channels. As another example, a system can leverage Internet of Things enabled refrigerators to monitor the temperature, moisture, and/or other factors that can have an adverse effect on a product within the refrigerator and calculate the percent depreciation in the quality of the product using additional information, such as information from the manufacturer of the product. The percent appreciation can also be calculated, such as for products like wine which gain more value as the age. The increment in the price of items which gain more value with time can also be possible. The price of the product can also increase, for example, if demand is increased to more than a threshold, if weather conditions are more favorable for the product in the coming days, and based on other factors.

The subject matter described herein provides many technical advantages. For example, some implementations of the current subject matter can facilitate monitoring the quality of products in real-time, determining appropriate prices for products given the quality of the products, and transmitting real-time promotions across all available channels. And some implementations of the current subject matter can mitigate the risk of the expiration of products. And, some implementations of the current subject matter can provide for better planning of the production and sales of products, betterment in the product by gauging the price over time (e.g., if the price of the product is falling abruptly then the production department can take product enhancement steps, if the price of the product is rising abruptly, and/or the like), better understanding of human behavior, for example, for marketing improvement, and/or the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   establishing, by a cloud-based server, a communications channel with a merchant device over a computer network, the merchant device having a product stored therein;
   receiving, by the cloud-based server, product information characterizing the product from the merchant device via the communications channel, the product information including at least one measurement characterizing the product acquired by at least one sensor communicatively coupled to the merchant device, the at least one measurement including storage temperature data characterizing a temperature of the product measured over a period of time in which the product is stored in the merchant device and the at least one measurement including storage brightness data characterizing a level of light within the merchant device measured over a period of time in which the product is stored in the merchant device, and the at least one sensor including a thermometer that acquires the storage temperature data and the at least one sensor including a light sensor that acquires the storage brightness data;

calculating, by the cloud-based server, a remaining life of the product based on the product information received from the merchant device, the calculating of the remaining life comprising calculating a percent depreciation of the product based on the received storage temperature data and the receive storage brightness data;

calculating, by the cloud-based server, a real-time price of the product based on a plurality of factors including the calculated remaining life of the product; and transmitting, by the cloud-based server, a promotion to purchase the product at a discount to a first client device in response to determining that the remaining life of the product is less than a predefined threshold, the discount calculated based upon the real-time price of the product.

2. The method of claim 1, further comprising:
transmitting, by the cloud-based server to a second client device and to be displayed on a graphical user interface display space of the second client device, at least one of the remaining life of the product, an original price of the product, the real-time price of the product, a number of remaining units of the product, and a flag indicating whether the promotion to purchase the product at the discount has been transmitted.

3. The method of claim 1, wherein the transmitting further comprises:
transmitting, to the first client device and to be displayed on a graphical user interface display space of the first client device, the promotion to purchase the product at the discount.

4. The method of claim 1, further comprising:
transmitting an alert to a second client device in response to calculating that the remaining life of the product is less than the predefined threshold; and
receiving, from the second client device, user input initiating the transmitting of the promotion to purchase the product at the discount to the first client device;
wherein the promotion to purchase the product at the discount is transmitted to the first client device in response to receiving the user input.

5. The method of claim 1, wherein calculating the remaining life of the product is further based on at least one of manufacturing date, expiration date, best-before date, demand and supply, favorable environmental conditions, favorable humidity, favorable packaging, favorable weather, and favorable solvents.

6. The method of claim 1, wherein the plurality of factors further includes at least one of environmental conditions, packaging, region, season, customer type, store type, humidity, light, number of units of the product remaining, age of the product, weather forecast, demand and supply, type of the product, and number of units of the product sold.

7. The method of claim 1, wherein the merchant device includes a communications-enabled refrigerator, a communications-enabled cold storage, a communications-enabled low humidity silica container, a communications-enabled humidity inducing water sprayer based container, a communications-enabled luminous container, a communications-enabled pH maintaining container, and a communications-enabled hot storage.

8. The method of claim 1, wherein the first client device includes at least one of a mobile device, a fuel dispenser, a television, a store display, a registered mobile device, a digital billboard, a video player in a car, a navigation system, a smart speaker, a smart watch, a health based fitness watch, a smart glasses, an advertisement display, and an advertisement communications channel.

9. A system comprising:
a merchant device communicatively coupled to at least one sensor and configured to:
receive, from the at least one sensor, product information characterizing a product stored within the merchant device, the product information including at least one measurement characterizing the product acquired by the at least one sensor, the at least one measurement including storage temperature data characterizing a temperature of the product measured over a period of time in which the product is stored in the merchant device and the at least one measurement including storage brightness data characterizing a level of light within the merchant device measured over a period of time in which the product is stored in the merchant device, and the at least one sensor including a thermometer configured to acquire the storage temperature data and the at least one sensor including a light sensor configured to acquire the storage brightness data;
establish a communications channel with a cloud-based server over a computer network; and
transmit the product information;
the cloud-based server configured to:
establish the communications channel with the merchant device over the computer network;
receive the product information characterizing the product from the merchant device via the communications channel;
calculate a remaining life of the product based on the product information received from the merchant device, the calculating of the remaining life comprising calculating a percent depreciation of the product based on the received storage temperature data and the received storage brightness data;
calculate a real-time price of the product based on a plurality of factors including the calculated remaining life of the product; and
transmit a promotion to purchase the product at a discount to a first client device in response to determining that the remaining life of the product is less than a predefined threshold, the discount calculated based upon the real-time price of the product; and
the first client device configured to:
receive, from the cloud-based server, the promotion to purchase the product at the discount.

10. The system of claim 9, further comprising:
a second client device comprising:
a graphical user interface display space;
wherein the cloud-based server is further configured to:
transmit, to the second client device, at least one of the remaining life of the product, an original price of the product, the real-time price of the product, a number of remaining units of the product, and a flag indicating whether the promotion to purchase the product at the discount has been transmitted; and
wherein the second client device is configured to:

receive at least one of the remaining life of the product, the original price of the product, the real-time price of the product, the number of remaining units of the product, and the flag indicating whether the promotion to purchase the product at the discount has been transmitted; and display, within the graphical user interface display space, at least one of the remaining life of the product, the original price of the product, the real-time price of the product, the number of remaining units of the product, and the flag indicating whether the promotion to purchase the product at the discount has been transmitted.

11. The system of claim 9, wherein the first client device further comprises:
a graphical user interface display space;
wherein the first client device is further configured to:
display, within the graphical user interface display space, the promotion to purchase the product at the discount.

12. The system of claim 9, further comprising:
a second client device;
wherein the cloud-based server is further configured to:
transmit an alert to the second client device in response to calculating that the remaining life of the product is less than the predefined threshold; and
receive, from the second client device, user input initiating the transmitting of the promotion to purchase the product at the discount to the first client device;
wherein the second client device is configured to:
receive the alert;
receive the user input; and
transmit, to the cloud-based server, the user input;
wherein the promotion to purchase the product at the discount is transmitted by the cloud-based server to the first client device in response to receiving the user input.

13. The system of claim 9, wherein calculating the remaining life of the product is further based on at least one of manufacturing date, expiration date, best-before date, demand and supply, favorable environmental conditions, favorable humidity, favorable packaging, favorable weather, and favorable solvents.

14. The system of claim 9, wherein the plurality of factors further includes at least one of environmental conditions, packaging, region, season, customer type, store type, humidity, light, number of units of the product remaining, age of the product, weather forecast, demand and supply, type of the product, and number of units of the product sold.

15. The system of claim 9, wherein the merchant device includes a communications-enabled refrigerator, a communications-enabled cold storage, a communications-enabled low humidity silica container, a communications-enabled humidity inducing water sprayer based container, a communications-enabled luminous container, a communications-enabled pH maintaining container, and a communications-enabled hot storage.

16. The system of claim 9, wherein the first client device includes at least one of a mobile device, a fuel dispenser, a television, a store display, a registered mobile device, a digital billboard, a video player in a car, a navigation system, a smart speaker, a smart watch, a health based fitness watch, a smart glasses, an advertisement display, and an advertisement communications channel.

17. A non-transitory computer program product storing instructions, which when executed by at least one data processor of at least one computing system, implement a method comprising:
establishing, by a cloud-based server, a communications channel with a merchant device over a computer network, the merchant device having a product stored therein;
receiving, by the cloud-based server, product information characterizing the product from the merchant device via the communications channel, the product information including at least one measurement characterizing the product acquired by at least one sensor communicatively coupled to the merchant device, the at least one measurement including storage temperature data characterizing a temperature of the product measured over a period of time in which the product is stored in the merchant device and the at least one measurement including storage brightness data characterizing a level of light within the merchant device measured over a period of time in which the product is stored in the merchant device, and the at least one sensor including a thermometer that acquires the storage temperature data and the at least one sensor including a light sensor that acquires the storage brightness data;
calculating, by the cloud-based server, a remaining life of the product based on the product information received from the merchant device, the calculating of the remaining life of the product comprising calculating a percent depreciation of the product based on the received storage temperature data and the received storage brightness data;
calculating, by the cloud-based server, a real-time price of the product based on a plurality of factors including the calculated remaining life of the product; and
transmitting, by the cloud-based server, a promotion to purchase the product at a discount to a first client device in response to determining that the remaining life of the product is less than a predefined threshold, the discount calculated based upon the real-time price of the product.

18. The non-transitory computer program product of claim 17, the method further comprising:
transmitting, to the first client device and to be displayed on a graphical user interface display space of the first client device, the promotion to purchase the product at the discount.

19. The method of claim 1, wherein the at least one measurement further includes storage humidity data characterizing a level of humidity within the merchant device measured over a period of time in which the product is stored in the merchant device, the at least one sensor further includes a moisture sensor that acquires the storage humidity data, and the percent depreciation of the product is also calculated based on the received storage humidity data.

20. The system of claim 9, wherein calculating the percent depreciation of the product includes comparing the received storage temperature data with a favorable temperature for the product.

21. The method of claim 1, wherein the cloud-based server calculates the real-time price of the product using a machine learning model, and wherein the calculated percent depreciation, data characterizing historical supply and historical demand of the product, and data characterizing historical sales of the product are used by the machine learning model to calculate the real-time price of the product.

22. The method of claim 21, wherein the data characterizing historical sales of the product used by the machine learning model is filtered based on a type of location at which the merchant device is located.

* * * * *